United States Patent [19]

Miller et al.

[11] 3,832,687

[45] Aug. 27, 1974

[54] PATTERN RECOGNITION SYSTEM

[75] Inventors: Melvin N. Miller, Wynnewood; Marshall S. Levine, Wayne, both of Pa.

[73] Assignee: Geometric Data Corporation, Wayne, Pa.

[22] Filed: July 3, 1973

[21] Appl. No.: 376,246

Related U.S. Application Data

[63] Continuation of Ser. No. 117,996, Feb. 23, 1971, abandoned.

[52] U.S. Cl. ............. 340/146.3 MA, 340/146.3 AC

[51] Int. Cl. ............................................ G06k 9/12

[58] Field of Search .............. 340/146.3 J, 146.3 Y, 340/146.3 AC, 146.3 MA, 146.3 S

[56] References Cited

UNITED STATES PATENTS

| | | | |
|---|---|---|---|
| 3,178,688 | 4/1965 | Hill | 340/146.3 AC |
| 3,341,814 | 9/1967 | Chow | 340/146.3 S |
| 3,522,586 | 8/1970 | Kiji | 340/146.3 MA |
| 3,564,498 | 2/1971 | Stern | 340/146.3 MA |
| 3,603,931 | 9/1971 | Britt | 340/146.3 J |

*Primary Examiner*—Raulfe B. Zache
*Assistant Examiner*—Robert F. Gnuse
*Attorney, Agent, or Firm*—Caesar, Rivise, Bernstein & Cohen

[57] ABSTRACT

A pattern recognition system is provided having storage means which includes a plurality of stages for storing quantized signals generated by scanning a field. The pattern recognition system includes a pattern detection means. The detection means is connected to the output of a plurality of stages of the storage means and also includes counting means for determining the number of times a predetermined event occurs in said storage means.

26 Claims, 7 Drawing Figures

INVENTORS.
MELVIN N. MILLER
MARSHALL S. LEVINE
BY
Caesar, Rivise,
Bernstein and Cohen
ATTORNEYS.

INVENTORS.
MELVIN N. MILLER
MARSHALL S. LEVINE
BY
Caesar, Rivise,
Bernstein and Cohen
ATTORNEYS.

INVENTORS.
MELVIN N. MILLER
MARSHALL S. LEVINE
BY
Caesar, Rivise,
Bernstein and Cohen
ATTORNEYS.

INVENTORS.
MELVIN N. MILLER
MARSHALL S. LEVINE
BY
Caesar, Rivise,
Bernstein and Cohen
ATTORNEYS INVENTORS.
MELVIN N. MILLER
MARSHALL S. LEVINE
BY
Caesar, Rivise,
Bernstein and Cohen
ATTORNEYS.

INVENTORS.
MELVIN N. MILLER
MARSHALL S. LEVINE
BY
Caesar, Rivise,
Bernstein and Cohen
ATTORNEYS.

PATTERN RECOGNITION SYSTEM

This is a continuation of application Serial No. 117,996, filed Feb. 23, 1971, now abandoned.

This invention relates generally to pattern recognition systems and more particularly to a pattern detector which detects patterns in accordance with the shape thereof irrespective of the pattern's horizontal, vertical or angular disposition.

Various systems have been developed for the detection of patterns and particularly in the area of character recognition. In substantially all of these systems, attempts are made to relate the configuration of the character with predetermined masks which are provided either in the hardware or software of the character recognition circuitry. That is, the systems normally use a binary quantization of the scanned field which is stored in a shift register or the like which effectively correlates the position scanned with a geometric position in the shift register. Suitable masks are then provided which are connected to various stages of the shift register so that either the entire character, various portions of a character or line intersections can be compared with hundreds and thousands of assorted masks in the computer so that when matches have been made, identification of the character can be made.

The aforementioned pattern recognition systems have failed and would continue to fail for use as a morphological analyzer. That is, the determination of shape in biological and natural or other systems requires that the classification in accordance with the shape of the objects be unaffected by the disposition of the object in a two dimensional plane. That is, in the case of a triangle, the morphological analyzer should be capable of distinguishing the triangle from a square, hexagon or circle no matter where the apex of the triangle is disposed with respect to the remainder of the triangle. Whether the apex is at the uppermost end of the triangle, to one side, or at the bottom, the morphological analyzer should be able to distinguish the same from the remaining shapes.

Distinguishing the shape, no matter what the angular disposition of the form, is a necessity for any natural system. For example, in order to make a differential white cell count in blood, a sample of whole blood is smeared and dried on a slide and a stain is used to enhance the contrast. A hundred or more of the white cells are observed, recognized and classified in order to accomplish the differential white cell count. A pattern recognition system can be used to distinguish between the various white cells if a pattern detector could be provided which can morphologically distinguish the various ones of the white blood cells. For example, three of the white blood cells that are found in a typical blood cell analysis are the segmented neutrophil, the monocyte and the lymphocyte. The nucleus of the segmented neutrophil is typically in at least two sections which are connected by a thin connecting strand. The nucleus of the typical monocyte blood cell can be considered to be somewhat U or V-shaped and the nucleus of the typical lymphocyte white blood cell is somewhat round.

The use of prior pattern recognition techniques to distinguish between just these three shapes alone would be extremely expensive on the basis that the number of masks required to distinguish the three would be prohibitive. That is, masks would have to be provided not only for one disposition of each of the three shapes, but would also have to be provided for each of the shapes at a substantially large number of angular dispositions. Thus, a mask would have to be provided for the monocyte nucleus not only at a first disposition but at at least a large number of other positions angularly rotated from the first position. Moreover, morphological shapes appearing in nature are not necessarily uniform in size or proportion. Accordingly, the masks provided have to be flexible enough that small deviations in a pattern do not prevent recognition thereof while being inflexible enough to prevent incorrect identification of patterns. This would require very large numbers of masks just for discriminating between patterns of similar but distinguishable shape.

Moreover, a still further problem for the prior art pattern recognition systems in morphological analyzing is based on the fact that objects occurring in nature are not always the same size. Thus, normalization would almost necessarily be required in order to enable fixed masks to be provided.

Where masks have been abandoned and other forms of recognition utilized in order to detect a pattern, the problems with analysis of the data developed has proven to be enormous. For example, in the article by Marcel J. E. Golay entitled "Hexagonal Parallel Pattern Transformations," IEEE Transactions on Computers, Vol. C-18, No. 8, August, 1969, hexagonal sampling modules have been utilized to transform or reduce the amount of data required for insertion into a computer for analyzing a pattern examined. However, even with this data reduction method, the analysis problem requires very long periods of time for discriminating between patterns. For example, use has been made of the Golay pattern transformations in automatic analysis of blood cells as indicated by an article entitled "Automatic Analysis of Blood Cells" by Marylou Ingram and Kendall Preston, Jr. in the November, 1970 issue of Scientific American, pages 72 et seq. Based on the time taken for analyzing a 32 by 32 point image, a 64 by 64 point image or a 128 by 128 point image, it can be determined that the analysis of four hundred white blood cells with the system shown therein would take an impractically large period of time. Accordingly, prior art pattern recognition systems which have not utilized masks have proven to be far too slow due to the data analysis problem inherent therein.

It is, therefore, an object of this invention to overcome the aforementioned limitations of prior pattern recognition systems.

Another object of the invention is to provide a new and improved pattern detecting system which can be used for morphological analyzing.

Yet another object of the invention is to provide a new and improved pattern recognition system which can distinguish between patterns irrespective of the horizontal, vertical or angular disposition of the objects to be distinguished.

Still another object of the invention is to provide a new and improved pattern recognition system wherein morphological variations within a pattern are minimized in identification of the pattern.

Another object of the invention is to provide a new and improved pattern detector which has application in blood cell analysis.

Another object of the invention is to provide a new and improved pattern detector which is relatively inexpensive and efficient.

These and other objects of the invention are achieved by providing a pattern detection system which utilizes a quantitative approach for determining the shape of a pattern. The pattern detector is connected to various points on a shift register which has shifted therethrough the quantization of signals generated by scanning the field in which the object appears. Counting means are also provided in the pattern detector to determine the number of times a predetermined event occurs as the quantized pattern is shifted through the storage means. On the basis of the quantitative data developed, various patterns can be distinguished from each other on the basis of the number of times certain events occur in the storage means.

Other objects and many of the attendant advantages of this invention will be readily appreciated as the same becomes better understood by reference to the following detailed description when considered in connection with the accompanying drawings wherein.

Figure 1:
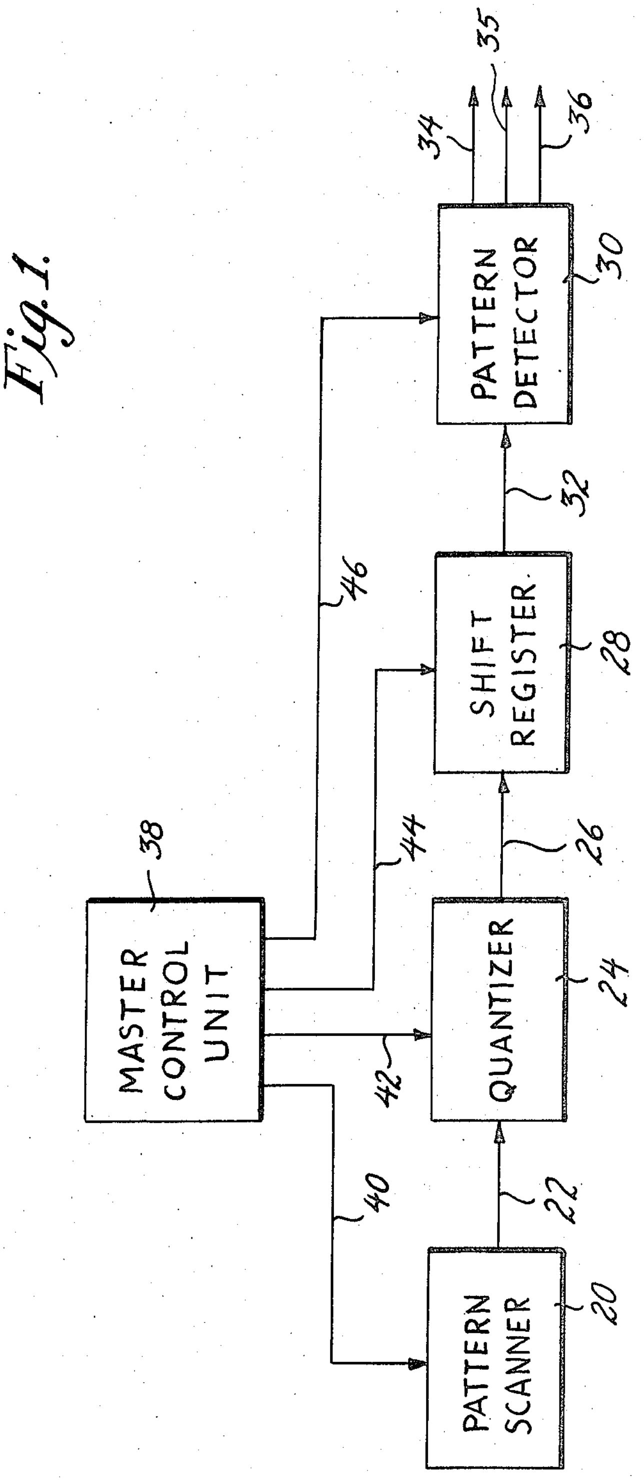
FIG. 1 is a schematic block diagram of a pattern recognition system embodying the invention.

Referring now in greater detail to the various figures of the drawing wherein like reference numerals refer to like parts, the pattern recognition system embodying the invention is shown generally in FIG. 1 and basically comprises a pattern scanner 20 which utilizes an optical scanner for scanning a field upon which the pattern to be distinguished is disposed. A pattern scanner which is used in blood cell analysis is shown in the aforesaid article by Marylou Ingram and Kendall Preston, Jr. The pattern scanner provides an analog signal which is generated by a photodetector therein on line 22 which is connected to a quantizer 24 which provides a binary quantization of the signal 22 on output line 26. The quantizer 24 is connected to a shift register 28 via line 26 and the binary quantization of the field scanned is shifted into shift register 28. A pattern detector 30 is connected to the shift register via output lines 32 which are connected to various ones of the stages of the shift register. The pattern detector 30 distinguishes the various patterns scanned by the pattern scanner and provides output signals on lines 34, 35 and 36 in accordance with the pattern detected by the pattern detector 30.

A master control unit 38 is provided which is connected to each of the units 20, 24, 28 and 30 via lines 40, 42, 44 and 46 which provide the necessary timing and control signals for the routing of data throughout the system.

In the preferred embodiment, the pattern scanner 20 is utilized to discriminate the various nuclei of white blood cells. Thus, referring to FIG. 2, a simplified drawing of a whole blood smear is depicted therein. The blood smear includes three white blood cells 50, 52 and 54. White blood cell 50 is a segmented neutrophil, white blood cell 52 is a monocyte and white blood cell 54 is a lymphocyte.

Figure 2:
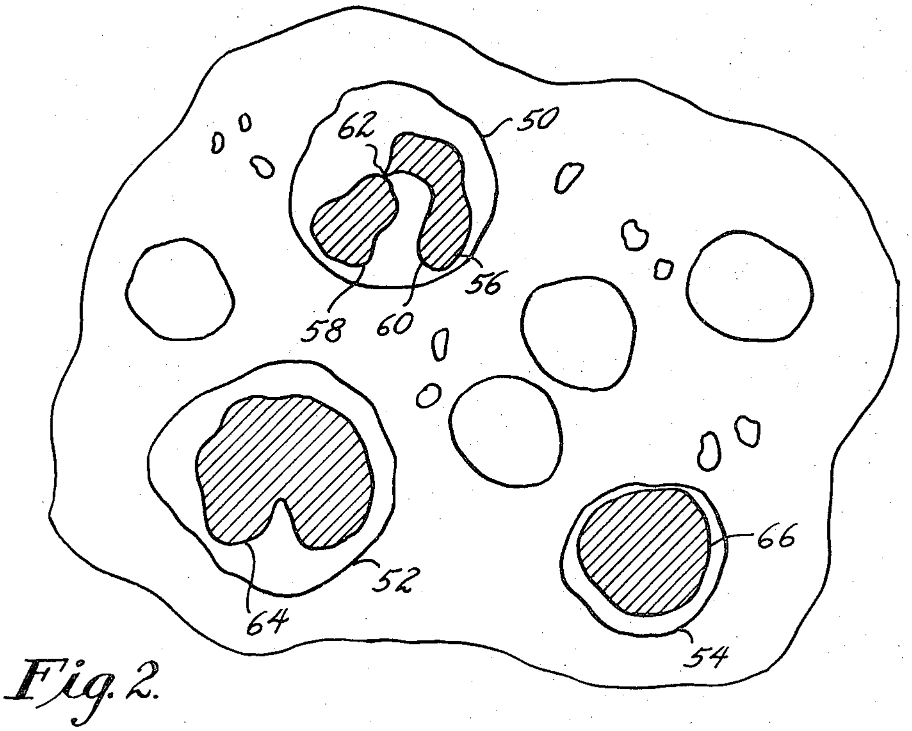
FIG. 2 is an enlarged fragmentary top plan view of a whole blood smear.

Each of the white blood cells consists of an inner dense pattern which, in FIG. 2, has been cross-hatched to indicate the density thereof. This dense pattern is the nucleus. Thus, white blood cell 50 includes a segmented nucleus 56 having portions 58 and 60 which are connected together only by a small connecting portion 62. White blood cell 52 includes a nucleus 64 which is somewhat U or V-shaped and white blood cell 54 includes a nucleus 66 which is somewhat round. Each of the white blood cells also includes a surrounding portion which is called the cytoplasm and which sometimes includes a plurality of granules which have not been shown in this drawing for purposes of clarity.

It can, therefore, be seen that based on the different shapes alone of the nuclei 56, 64 and 66 of white blood cells 50, 52 and 54, these blood cells can be distinguished. While the principles of the pattern detection system utilized herein can be used to distinguish between other patterns, this description is limited for purposes of clarity to distinguishing between the three types of patterns represented by the nuclei 56, 64 and 66 which are a segmented form, a U-shaped form and a somewhat circular form.

Figure 3:
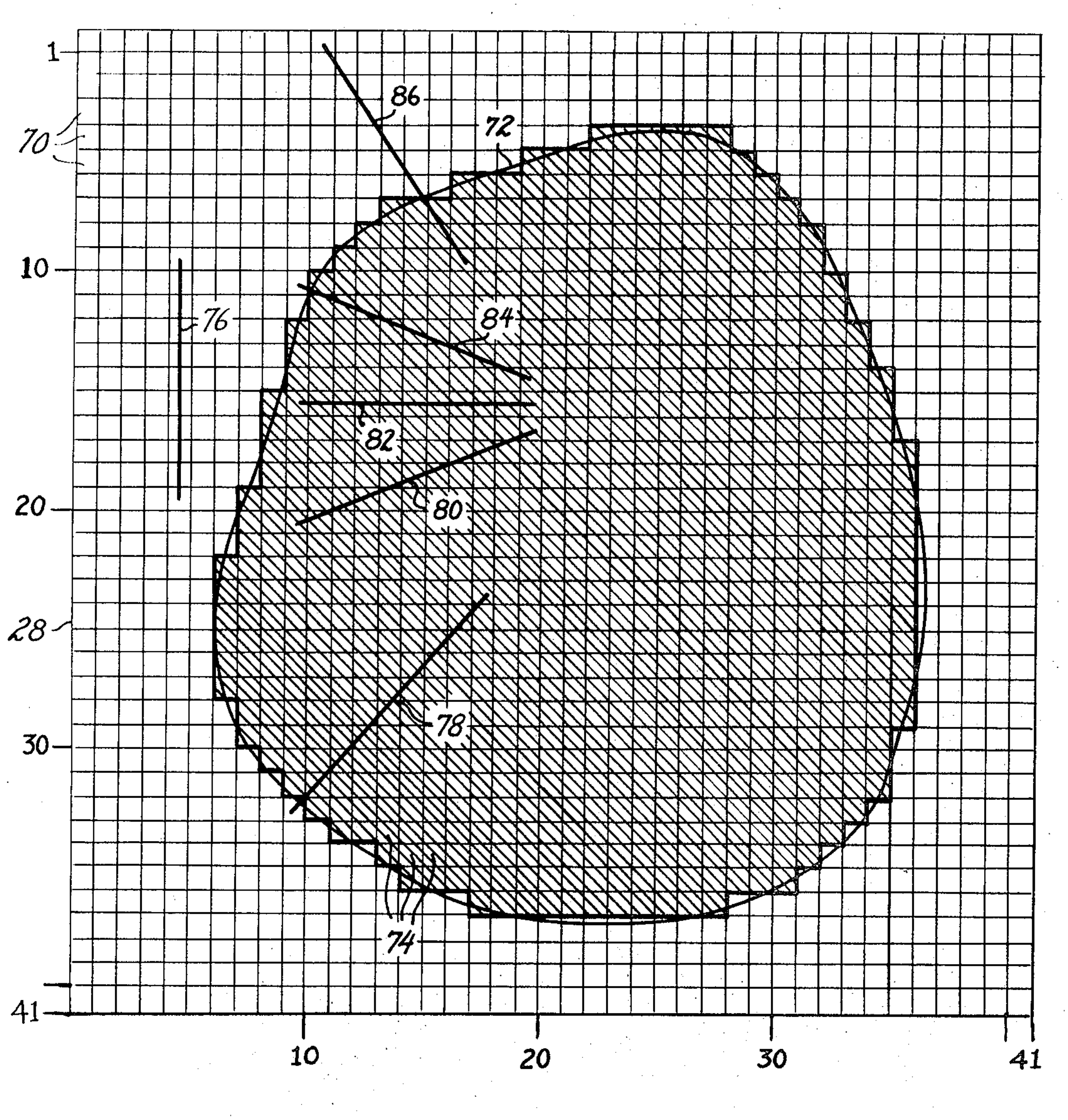
FIG. 3 is a diagrammatic top plan view of a shift register superimposed over a scanned field.

As set forth above, FIG. 3 is a diagrammatic illustration of a shift register as superimposed over the field which has been scanned. That is, square box 28 in FIG. 3 is a diagrammatic representation of shift register 28. Stages of the shift register 28 are represented by the square boxes 70 comprising square box 28. Each of the boxes 70, as located in FIG. 3 within box 28, corresponds to the area of the field scanned over which the box 70 is superimposed.

The field encompassed by the periphery of box 28 includes a somewhat round pattern 72 which is located completely within the box 28. It should be noted that overlying the pattern 72 is a plurality of boxes 70 which have been shaded or cross-hatched at 74. All of the boxes 74 that include the shading or cross-hatching represent stages in shift register 28 which are in the 1 or black state. The 1 or black state indicates that the threshold level of quantization represents that an area on the field scanned is more black than white. The quantization is, of course, idealized since all of the stages within the outline 72 are substantially shaded or in the 1 state.

The operation of pattern detector 30 which is connected to various ones of the outputs of the shift register 28 is based on the determination that the random placement of a substantially infinite number of lines at all orientations on a field will provide a ratio comprised of the number of times that both ends of the line are on a black area divided by the number of times that at least one end of the line is in a black area which is directly dependent on the shape of the pattern. That is, if a substantially infinite number of line ends are sampled on the area scanned in FIG. 3 and the number of times that both ends of the line fall on the black, (i.e., the area within the outline of pattern 72) is accumulated and if the number of times that at least one end of the line falls within the black area is also accumulated, division of the former accumulation by the latter would produce a ratio which is substantially the same each time a pattern of the same shape has been examined regardless of the orientation of the pattern.

Referring again to FIG. 3, it can be seen that six lines 76, 78, 80, 82, 84 and 86 have been placed in the field which has been scanned in FIG. 3. Each of lines 76 through 86 are approximately 10 units in length wherein each unit represents the space between samples or the resolution of quantized samples taken on the field within box 28. The angular disposition of line 76 is 0° with respect to the vertical. Line 78 is rotated 30° with respect to the vertical, line 80 is rotated 60° with respect to the vertical, line 82 is rotated 90° with respect to the vertical, line 84 is rotated 120° with respect to the vertical and line 86 is rotated 150° with respect to the vertical.

For the positions shown in FIG. 3 of the lines 76 through 86 with respect to pattern 72, it can be seen that only lines 80 and 82 satisfy the criteria of both ends of the line falling within the black area within the outline of pattern 72. It should also be noted that one end of lines 78, 80, 82 84 and 86 is also located within the black area within the outline of pattern 72. However, six lines on the field do not adequately represent an infinite number of lines provided on the scanned field. But, by moving each of the lines 76 thorugh 86 one unit to the right with respect to pattern 72, provides another six samples which can be utilized for determining the ratio. This principle enables the provision of a plurality of two-point masks, each of which represents or effectively samples both ends of a line and a one-point mask which can be sampled for each state of progression of the quantized pattern in the shift register 28. Thus, for each shift of the quantized pattern 74 through shift register 28, a sample for each of the lines is made and the pattern is then shifted to the next position wherein the next six samples are taken for each of the lines of ten units length. In addition to lines 76 through 86 which are representative of separations of points ten units in length, four other groups of lines are sampled which are twenty units, thirty units, forty units and five units between the ends of the line.

In each group of lines, one of the lines is at a disposition of 0° with respect to the vertical, 30° rotated from the vertical, 60° rotated from the vertical, 90° rotated from the vertical, 120° rotated from the vertical and 150° rotated from the vertical. Angle differences of approximately 30° have been found to be adequate in blood cell morphology to determine the shape of the pattern no matter what the angular disposition thereof. Where more complex shapes are to be distinguished, a larger number of lines in each group can be sampled for within the shift register. The use of lines disposed at the angles of 180° to 330° is unnecessary since the information generated thereby is redundant. That is, for example, a line disposed at 180° is at the same disposition as the vertical line and so on.

Figure 4:
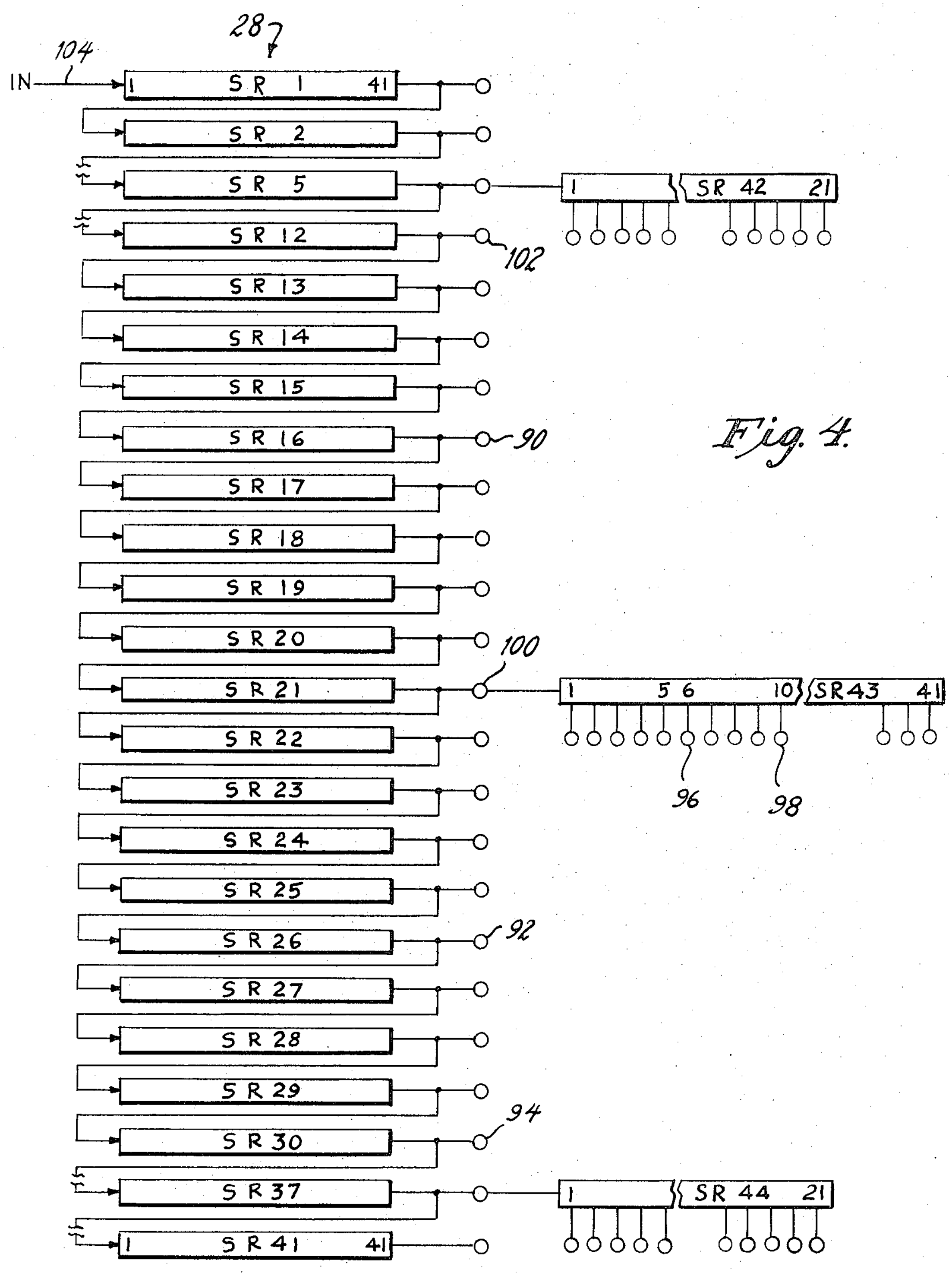
FIG. 4 is a schematic block diagram of a shift register used for serially storing the binary quantization of a scanned pattern.

The shift register 28 is shown in greated detail in FIG. 4. As seen therein, the shift register 28 is basically comprised of 41 shift registers of 41 stages each. Stages SR1 through SR41 are connected end to end with the 41st stage of shift register SR1 being connected to stage one of shift register SR2. The stage 41 of shift register SR 2 is connected to the first stage of shift register SR3 and so on through stage 41 of shift register stage SR40 which is connected to shift register stage one of shift register SR41.

Also provided as part of shift register 28 are three shift registers SR42, SR43 and SR44 which are, respectively, connected to the 41st stages of shift registers SR5, SR21 and SR37. That is, the first stage of shift register SR42 is connected to the output of stage 41 of shift register SR5. Stage one of shift register SR43 is connected to the output of stage 41 of shift register SR21 and the first stage of shift register SR44 is connected to the output of the 41st stage of shift register SR37.

Shift registers SR1 through SR41 are each prefereably comprised of integrated circuits which do not have outputs at all of the stages thereof. That is, typically the integrated circuits include outputs only at the last stage thereof, and, thus, can be sampled only at the 41st stage thereof. However, the cost of such shift registers is very inexpensive with respect to shift registers which can be sampled at the outputs of each of the stages thereof.

However, by providing shift registers SR42, SR43 and SR44 at the outputs of stages 41 of shift registers SR5, SR21 and SR37, two point or input gates can be adequately connected to the shift register 28. That is, each of the shift registers SR1 through SR41 have output terminals connected to stage 41 thereof. Shift register SR42 is preferably a 21 stage shift register which includes output terminals at each of its stages, shift register SR43 is preferably 41 stages and includes an output terminal at each of its stages and shift register SR44 is also a 21 stage shift register having an output terminal at each of its stages.

Thus, a detection means for determining that both ends of line 76 are in a block portion of the scanned field can be connected to terminals 90 and 92 which are connected to the 41st stages of shift registers SR16 and SR26, respectively. The detection means comprising a gate with two inputs for determining a two-point event based on the ends of line 78 can be connected to terminal 94 which is connected to the 41st stage of shift register 30 and terminal 96 of shift register SR43 which is connected to the sixth stage thereof.

Similarly, the detection of line 80 is simulated by connection of a gate to the output of terminal 92 and to terminal 98 which is the output line of stage ten of shift register SR43. The detection of line 82 is simulated by connecting a gate to the output of terminal 100 which is the output of stage 41 of shift register SR21 and to terminal 98. The detection of line 84 is simulated by the connection of a gate to the output of terminals 90 and 98 and the detection of line 86 is performed by connecting a gate to the output terminals 96 and 102, which is the output of stage 41 of shift register SR12.

It should be understood that the quantized signal generated by the sampling of a field is provided on input line 104 and progresses through to shift register SR41 in the same manner as if shift registers SR42, SR43 and SR44 were not part of the shift register. But, it should also be understood that the results of connecting the gates or detectors to shift register 28 as shown in FIG. 4 are exactly the same as if the outputs of the stages shown in FIG. 3 as the end points of the lines 76 through 86 were used in sampling the quantized pattern as it shifts through shift register 28. Shift registers SR42 and SR44 are utilized for providing detection gates for the two-point events where the points are separated by forty units and other long separations.

It should also be noted that the points selected in FIG. 4 for sampling the pattern as it progresses through the shift register could have also been taken at different ones of the points that can be sampled in shift register 28 as shown in FIG. 4. Since the entire pattern will progress through the shift register stages sampled, the points at which the lines are sampled are then substantially irrelevant as long as the stages sampled are spartially related like those sampled in FIG. 4.

For ease of reference hereinafter, the detection of both ends of a line within a black area is characterized as the detection of a two-point event. Similarly, each time the single stage sampled is in a black area, it is considered as the detection of a one-point event. In the preferred embodiment, stage 41 of shift register SR21 is sampled by connection of the one-point detector means to output terminal 100 to determine the number of times that the one point is on a black area.

The event detector (FIG. 5) which forms a portion of the pattern detector 30 is comprised of a pluality of group multiplexors 110. Five group multiplexors 110 are provided, each of which corresponds to a group of lines which are of the same length. For example, the leftmost group multiplexor 110 is associated with each of the masks which are determinative of two-point events wherein the points are separated by a spacing of ten units.

Each of the group multiplexors 110 are similarly comprised and each includes six AND gates 112, 114, 116, 118, 120 and 122. AND gates 112 through 122 each include three inputs, two of which are connected to a pair of output terminals from the shift register 28.

Thus, AND gate 112 of the ten unit group multiplexor is effectively the gate for line 76 which is a 10 unit line at an angular spacing of 0°. Thus, a first input line of gate 112 is connected to output terminal 90 and the second input to AND gate 112 is connected to output terminal 92.

Figure 5:
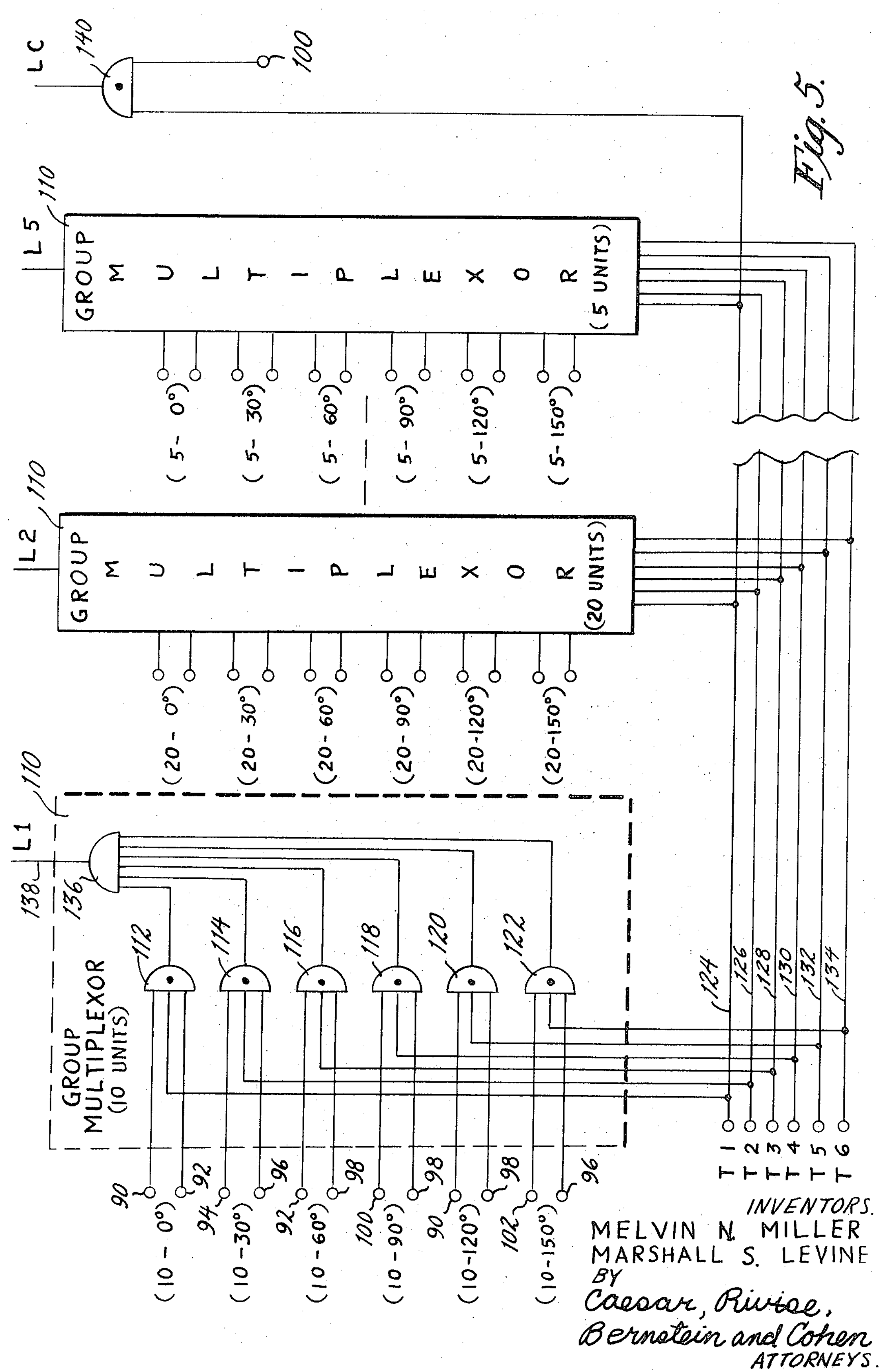
FIG. 5 is a schematic block diagram of the event detecting portion of the pattern detector.

The legend (10°–0°) which appears adjacent terminals 90 and 92 in FIG. 5 indicates that terminals 90 and 92 are associated with the 10 unit, 0° line. Similarly, AND gate 114 has two of its inputs connected to output terminals 94 and 96, AND gate 116 has two of its inputs connected to terminals 92 and 98, AND gate 118 has two of its inputs connected to output terminals 100 and 98, AND gate 120 has two of its inputs connected to output terminals 102 and 96 which are associated, respectively, with the 10 unit lines at 30°, 60°, 90°, 120° and 150°.

The third input to AND gate 112 is connected to line 124 which is connected to a source of clock pulses T1. The third input line of gate 114 is connected to line 126 which is connected to a source of input pulses T2, the third input line of gate 116 is connected to line 128 which is connected in turn to a source of input pulses T3, the third input line of AND gate 118 is connected to line 130 which is in turn connected to a source of input pulses T4, the third input line of gate 120 is connected to line 132 which is connected to a source of input pulses T5 and the third input line of gate 122 is connected to line 134 which is in turn connected to a source of input pulses T6. Clock pulses T1 through T6 are provided by the master control unit 38. The relationship of the timing pulses T1 through T6 are best seen in FIG. 6 which shows the relationship of the timing pulses T1 through T6 with respect to the shift pulses which are provided to the shift register 28.

Figure 6:
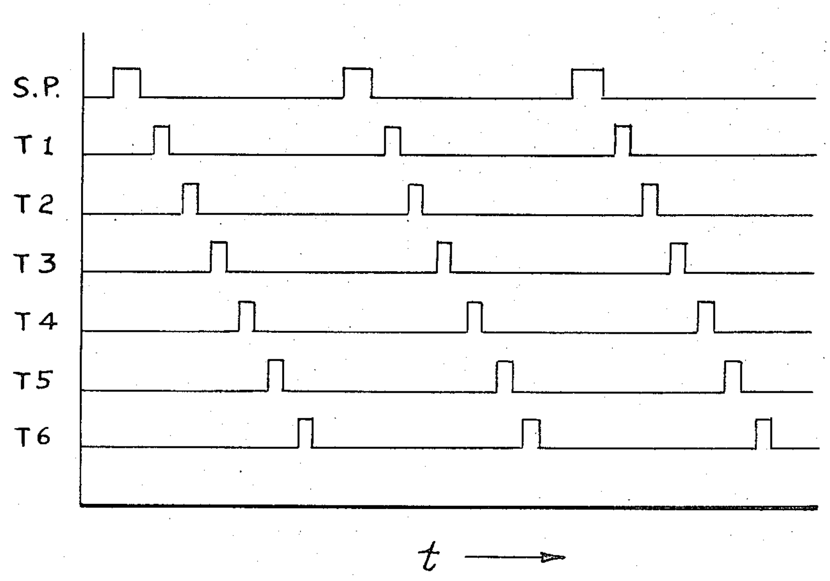
FIG. 6 is a timing diagram showing the relative timing between various ones of the control pulses utilized in the pattern detector.

As seen in FIG. 6, after each shift pulse, pulses T1 through T6 are sequentially generated. The sixth timing pulse is completed before the next shift pulse. Thus, after the first shift pulse in FIG. 6 is generated, the first pulse T1 is generated then the next pulse T2 and so on through T6. The second shift pulse is then generated and then each of pulses T1 through T6 is sequentially generated and so on until the entire quantized pattern is shifted through shift register 28.

The outputs of gates 112 through 122 are each connected to an OR gate 136 in the group multiplexor 110. The output of OR gate 136 is provided on output line 138 which is the output of the 10 unit group multiplexor 110 and which is labeled L1. The group multiplexors for the 20 unit, 30 unit, 40 unit and five unit lines are each similarly constructed.

Although only three of the group multiplexors are shown in FIG. 5, it should be understood that the group multiplexors associated with the 30 unit and 40 unit are similarly connected to the output stages of shift register 28 as described hereinabove and to the lines 124 through 134 as in the 10 unit group multiplexor 110. Thus, the group multiplexor (20 unit) 110 has the inputs of its gates connected to the terminals associated with the twenty unit lines at 0°, 30°, 60°, 90°, 120° and 150°. Similarly, the group multiplexors associated with the 30 and 40 unit lines are connected to the 30 unit and 40 unit lines at 0° through 150° dispositions and the group multiplexor for the 5 unit line is similarly connected to the terminals associated with five unit lines at 0° through 150°.

After a shift pulse has moved the quantized pattern to a new position within the shift register, the first pulse T1 enables the gate 112 in each of the group multiplexors to determine whether a two point event has occurred in the various portions of the shift register at which the gates are sampling. This, if a black quantization is indicated at the stages connected to output terminals 90 and 92, AND gate 112 of the 10 unit group multiplexor is enabled thereby providing an output pulse to OR gate 136 which in turn produces an output pulse on line 138.

If either terminal 90 or terminal 92 is connected to a stage which has a 0 or white area indicated therein, the AND gate cannot be enabled by the pulse T1 and, thus, a two point event will not be indicated and no output pulse will be provided on output line 138. Similarly, gates 114 through 122 are enabled in sequence by the pulses T2 through T6 to indicate two-point events at the stages which are connected to the respective gates 114 through 122. Thus, for each two-point event which is detected during the scanning of the group multiplexor, one pulse is provided on output line 138.

The five group multiplexors are simultaneously sampled by the pulses T1 through T6 so that the sampling fo two-point events at the various point separations are made concurrently. The event detector further includes an AND gate 140. AND gate 140 is connected at one of its inputs to the output terminal 100 and at its other input to line 124. AND gate 140, thus, acts as the one-point event detector because each time the stage connected to output terminal 100 has a black quantization, gate 140 is enabled during the generation of pulse T1 on line 124. The output line LC of AND gate 140, thus, has produced thereon an output pulse for each bit of the quantization signal indicating a black area has been scanned in the entire scan raster.

Figure 7:
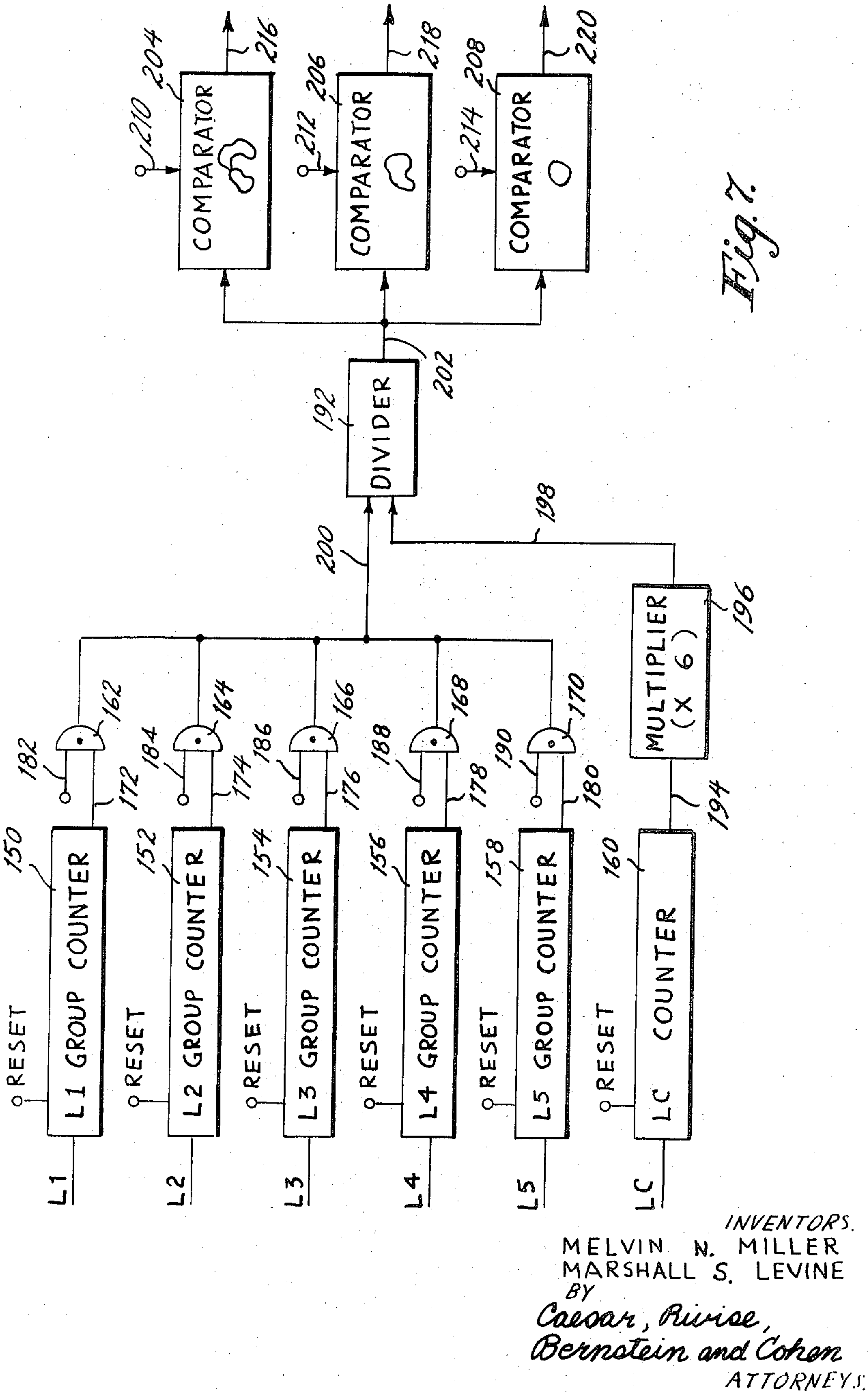
FIG. 7 is a schematic block diagram of the event counting and calculation portion of the pattern detector.

The event counting and calculation portion of the pattern detector is shown in FIG. 7. The event counting and calculation unit basically includes six counters 150, 152, 154, 156, 158 and 160 which are each connected to the output of lines L1 through L5 and LC, respectively. Thus, counter 150 counts the number of two-point event occurrences in the group of the first length L1, counter 152 counts the number of two point events which have occurred of a point separation of a second length L2 and so on through group counter 158 which counts the number of times a two-point event has occurred having a separation of L5.

Counter 160 counts the number of times that a one-point event occurs. A plurality of gates 162, 164, 166, 168 and 170 are also provided. These AND gates 162 through 170 are connected to the output of group counters 150 through 158, respectively. Each of the gates 162 through 170 actually represents a plurality of gates, each of which is connected to a different output stage of the respective group counter so that the output of the counters can be read out in parallel. Group counter 150 is, thus connected to gates 162 via output lines 172, group counter 152 is connected to AND gates 164 via output lines 174, group counter 154 is connected to plurality of gates 166 via output lines 176, group counter 156 is connectd to AND gates 168 via output lines 178 and group counter 158 is connected to AND gates 170 via output lines 180.

AND gates 162 through 170 each include a set of input lines 182, 184, 186, 188 and 190, respectively. The input lines 182 through 190 are connected from the master control unit 38 which has programmed therein which of the lines 182 through 190 should be enabled in order to pass the appropriate group count to divider 192. That is, by experimentation, it can be found which of the lengths of line provide the most useful data to distinguish between various patterns. In the instant case wherein it is the function of the pattern detector to discriminate between a segmented pattern, a U-shaped pattern and a somewhat round pattern wherein the pattern is generated by the nucleus of various white blood cells, it has been determined that the lines of ten resolution units provide the most distinction between the various ratios determined, lines 182 to AND gates 162 are enabled and the remaining lines 184 through 190 receive no enabling pulses. Gates 162 are connected to the L1 group counter which is an accumulation of two-point events based on ten unit lines. Thus, the output of the L1 group counter 150 is provided to the divider 192 by the enabling pulses on lines 182 to AND gates 162 after the quantized pattern has been completely shifted through the shift register 28.

The LC counter 160 which determines the number of one-point events is connected via lines 194 to a multiplier 196. Multiplier 196 multiplies the number provided on lines 194 by six and provides the output on lines 198 which are in turn connected to divider 192. Multiplier 196 is provided so that the number of one-point events is multiplied in accordance with the number of two-point events sampled for at each position of the quantized pattern in shift register 28. That is, as set forth above, the denominator of the ratio is determined in accordance with the number of times at least one point on a line is located in a black area on a scanned field. Accordingly, since this determination is made once for each line, the number of times that a one-point event occurs must be multiplied in accordance with the number of lines sampled for each group.

The divider 192 receives one of the group counts on line 200 as determined by the control pulses on lines 182 through 190 and divides the same by the count on line 198. This provides a numerical ratio which is provided on output lines 202 of the divider 192 to each of three comparators 204, 206 and 208.

As indicated by the patterns shown in the comparators in FIG. 7, it can be seen that comparator 204 is utilized to determine a ratio indicative of a segmented pattern, comparator 206 is utilized to determine a ratio indicative of a U-shaped pattern and comparator 208 is utilized to determine the ratio corresponding to a somewhat round pattern.

Each of the comparators 204, 206 and 208 also has input lines 210, 212 and 214 connected to the inputs, respectively, which are also connected to the master control unit 38. For comparator 204, lines 210 carry the information determining the range of ratios within which a segmented pattern would normally fall. Similarly, comparator 206 receives on lines 212 the range of ratios within which a U-shaped pattern should fall and comparator 208 receives on lines 214 the range of ratios within which a somewhat circular pattern should normally fall. When the value of the signals on line 202 falls within the range indicated on lines 210, comparator 204 provides an output signal on line 216 indicating that a segmented pattern has been detected. Similarly, if comparator 206 receives signals on lines 202 which fall within the range of values provided on lines 212, the comparator 206 provides a signal on line 218 indicative of the detection of a U-shaped pattern and comparator 208 provides an output signal on lines 220 thereof when the value of the signals on line 202 falls within the range of values provided on lines 214.

It can, therefore, be seen that a new and improved pattern detector and/or discriminator has been provided. The patterns which are to be detected can be analyzed irrespective of the angular disposition of the pattern within the scanned field. The provision of groups of lines which are each inclusive of a plurality of angularly spaced lines for the detection of the number of two point events effectively makes the disposition of the pattern angularly immaterial. Similarly, the determination of the ratio on the basis of the number of one-point events which occur in the detection of the pattern as it is shifted through the shift register acts to adjust the quantitative information generated by scanning the pattern so that a small range of sizes of similar patterns does not materially affect the ratio.

The generation of group counts for a plurality of sizes of units not only enables pattern discrimination on the basis of an ideal size for an entire group of patterns, but also enables the cross-correlation for discrimination between two very similar patterns at more optimum lengths of two-point events for discriminating between the two more similar patterns.

Finally, it should be noted that the amount of circuitry required to discriminate between patterns on the basis of the quantitative determination of the number of two-point and one-point events is considerably reduced. Each of the group multiplexors requires only one gate for each two-point event checked. The one-point event, which is sampled, requires only a single AND gate. Similarly, only one counter is provided for each of the L group counts and the one point count.

It has also been found that three-point events are a very valid distinguisher between various complicated patterns. This would be the equivalent of providing an infinite number of triangles on a field and providing a ratio in a similar manner to that provided with lines. That is, as an example, the number of times each of the three points of a triangle fall within a dark area is used as the numerator of the ratio and the number of times one point of the triangle is in a black portion of the scanned area is used as the denominator of the ratio. Instead of using three input AND gates in the group multiplexors, it would be necessary only to use four input gates for each of the group multiplexors and each gate would be connected to three output lines of the shift register in accordance with the separation between each of the three corners of the triangle. As set forth above, there are many cases where a large number of patterns to be detected would cause various of the patterns to be at similar or very close ratios for one length of line. Accordingly, to discriminate between patterns that fall within similar ratios at one length of line, further discrimination between the patterns can be made by discriminating between the ratios at different lengths of line or, in the alternative, further discrimination can be made on the basis of three-point event, four-point event or more ratios.

It should be noted that although in the preferred embodiment, samples are taken at each position of the signal pattern in the shift register, the sampling may also be taken at random intervals and/or predetermined intervals.

FInally, the quantitative data generated by the sampling and counting is usable not only for pattern detection but also, for example, in the recognition of other morphological characteristics such as surface to area ratios, average quantity and size.

Without further elaboration, the foregoing will so fully illustrate our invention that others may, by applying current or future knowledge, readily adapt the same for use under various conditions of service.

What is claimed as the invention is:

1. In a pattern recognition system for discrimination of a pattern from a plurality of selected possible patterns, means for generating a signal representative of the relative darkness of a plurality of discrete areas of a field, means for simulating the superimposing of a geometric pattern unrelated to the shape of said selected possible patterns a plurality of times on said field, and means responsive to said means for generating a signal and to said means for simulating for statistically accumulating the number of times that a predetermined plurality of points on said goometric pattern unrelated to said selected possible patterns falls within the pattern in said field with respect to the number of times that said unrelated pattern is superimposed on said field and discrimination means responsive to said output signal for distinguishing said pattern in said field from said plurality of selected possible patterns in accordance with the magnitude of said number of times.

2. The pattern recognition system of claim 1 wherein said means for simulating simulates the superimposing of said geometric pattern in a plurality of different angular dispositions with respect to said field.

3. The pattern recognition system of claim 1 wherein said geometric pattern is a straight line.

4. The pattern recognition system of claim 3 wherein said selected points on said geometric pattern are the end points of said line.

5. The pattern recognition system of claim 1 wherein said means for simulating the superimposing of a geometric pattern comprises storage means having a plurality of stages connected to said means for generating a signal, and detection means connected to selected ones of said stages.

6. The pattern recognition system of claim 5 wherein said means for generating a signal includes means for scanning a field, and quantization means responsive to said means for scanning for providing to said storage means the binary quantization of the signal representative of the relative darkness of said field.

7. The pattern recognition system of claim 6 wherein said storage means comprises a shift register and said quantized signals are shifted therethrough.

8. The pattern recognition system of claim 7 wherein said detection means examines said quantized signals at a plurality of positions in said shift register.

9. The pattern recognition system of claim 1 and further including second means responsive to said means for generating a signal for accumulating the number of times that said signal representative of the relative darkness is at a predetermined level.

10. The pattern recognition system of claim 9 and further including means or generating the relationship of the number of times that said plurality of points on said geometric pattern falls within said pattern in said field with respect to the number of times that said signal is at a predetermined level.

11. The pattern recognition system of claim 9 wherein said detection means includes at least one detector which is connected to the outputs of at least two stages of said storage means.

12. The pattern recognition system of claim 11 wherein said detector is enabled when each of the stages to which it is connected is in a state representative of a first quantization level, said means responsive accumulating the number of times said detector is enabled.

13. The pattern recognition system of claim 12 wherein said detection means includes a plurality of groups of detectors, each group of detectors being connected to a pair of stages in said storage means which are similarly spatially related with respect to length, each of said groups of detectors being connected to differently spaced stages.

14. The pattern recognition system of claim 11 wherein a plurality of said detectors are provided, each of which is connected to a plurality of stages of said storage means, each plurality of stages being similarly spatially related with respect to the spacing therebetween.

15. The pattern recognition system of claim 14 wherein each of said plurality of stages comprises a pair of stages.

16. The pattern recognition system of claim 15 wherein said plurality of pairs of stages each are representative of the end points of a line, and each of said lines are at a different angular disposition.

17. The pattern recognition system of claim 15 wherein said quantization of signals is serially shifted through said storage means, said plurality of detectors being sampled to determine the number of said detectors enabled for each disposition of said quantized signals in said storage means.

18. The pattern recognition system of claim 17 wherein said plurality of detectors is sequentially sampled.

19. The pattern recognition system of claim 10 wherein means are provided for analyzing said relationship generated, said analyzing means detecting a pattern when said relationship falls within predetermined limits.

20. In a pattern recognition system having storage means including a plurality of stages for storing the quantization of signals generated by scanning a field, pattern detection means, said detection means being connected to the output of a plurality of stages of said storage means and counting means in said detection means for determining the number of times a predetermined event corresponding to a predetermined condition of at least two of said stages occures in said storage means, wherein said detection means includes a plurality of detectors, each of which is connected to a plurality of stages of said storage means, each plurality of stages being similarly spatially related with respect to the spacing therebetween, each of said plurality of stages comprising a pair of stages and said plurality of pairs of stages each are representative of the end points of a line and each of said lines is at a different angular disposition, said detection means also including a detector connected to a single stage of said storage means, said detector being enabled each time the state of said stage is representative of said first quantization level, said counting means accumulating the number of times said single stage detector is enabled, and means for generating the relationship of the number of times that said two stage detectors are enabled with respect to the number of times said single stage detector is enabled.

21. In a pattern recognition system for discrimination of a pattern from a plurality of selected possible patterns, means for generating a signal representative of the relative darkness of a plurality of discrete areas of a field, means for simulating the superimposing of a geometric pattern unrelated to the shape of said selected possible patterns a plurality of times on said field, said geometric pattern being superimposed on said field in a plurality of angular dispositions with respect to said field, and means responsive to said means for generating a signal and to said means for simulating for statistically accumulating the total number of times that a predetermined plurality of points on said geometric pattern unrelated to said selected possible patterns falls within the pattern in said field with respect to the number of times that said unrelated pattern is superimposed on said field, said total number including the number of times that said predetermined plurality of points falls within said pattern for all of the angular dispositions of said unrelated pattern.

22. In a pattern recognition system for discrimination of a pattern from a plurality of selected possible patterns, means for generating a signal representative of the relative darkness of a plurality of discrete areas of a field, means for simulating the superimposing of a geometric pattern unrelated to the shape of said selected possible patterns a plurality of times on said field, first means responsive to said means for generating a signal and to said means for simulating for statistically accumulating the total number of times that a predetermined plurality of points on said geometric pattern unrelated to said selected possible patterns falls within a pattern in said field with respect to the number of times that said unrelated pattern is superimposed on said field, second means responsive to said means for generating a signal for accumulating the number of times that said signal is at a predetermined level, and means for generating the relationship of the number of times that said plurality of points on said geometric pattern falls within said pattern in said field with respect to the number of times that said signal is at a predetermined level.

23. In a pattern recognition system for discrimination of a pattern from a plurality of selected possible patterns, means for generating a signal representative of the relative darkness of a plurality of discrete areas of a field, means for simulating the superimposing of at least one geometric pattern unrelated to the shape of the selected possible patterns, said geometric pattern being utilized for recognizing all of said possible patterns, means responsive to said means for generating a signal and to said means for simulating for statistically accumulating the number of times that a predetermined plurality of points on said geometric pattern unrelated to said selected possible patterns falls within the pattern in said field with respect to the number of times that said unrelated pattern is superimposed on said field and discrimination means responsive to said output signal for distinguishing said apttern in said field from said plurality of selected possible patterns in accordance with the magnitude of said number of times siad predetermined plurality of points on said single pattern falls within the pattern on said field.

24. In a pattern recognition system for discrimination of a pattern from a plurality of selected possible patterns, means for generating a signal representative of the relative darkness of a plurality of discrete areas of a field, means for simulating the superimposing of a geometric pattern unrelated to the shape of said selected possible patterns a plurality of times on said field, said geometric pattern being superimposed on said field to simulate the random superimposing of said geometric pattern on said field and means responsive to said means for generating a signal and to said means for simulating for statistically accumulating the number of times that a predetermined plurality of points on said geometric pattern unrelated to said selected possible patterns falls within the pattern in said field with respect to the number of times that said unrelated pattern is superimposed on said field.

25. In a pattern recognition system for discrimination of a pattern from a plurality of selected possible patterns, means for generating a signal representative of the relative darkness of a plurality of discrete areas of a field, means for simulating the superimposing of a plurality of geometric patterns unrelated to the shape of said selected possible patterns a plurality of times on said field, first means responsive to said means for generating a signal and to said means for simulating for accumulating the total number of times that a predetermined plurality of points on a first of said geometric patterns unrelated to said selected possible patterns falls within the pattern in said field, second means responsive to said means for generating a signal and to said means for simulating for accumulating the number of times that at least one point in a second geometric pattern unrelated to said selected possible patterns falls within the pattern in said field, and means for generating the relationship of the number of times that said plurality of points on said first geometric pattern falls within said pattern in said field with respect to the number of times that said at least one point on said second geometric pattern falls within said pattern on said field.

26. In a pattern recognition system for discrimination of a pattern from a plurality of selected possible patterns, means for generating a signal representative of the relative darkness of a plurality of discrete areas of a field, means for simulating the superimposing of a plurality of geometric patterns unrelated to the shape of said selected possible patterns a plurality of times on said field, first means responsive to said means for generating a signal and to said means for simulating for statistically accumulating the total number of times that a predetermined plurality of points on each of said geometric patterns unrelated to said selected possible patterns falls within the pattern in said field, said accumulating means obtaining the total the number of times that each of said unrelated patterns is superimposed on said field, and discriminating means responsive to said means for accumulating the number of times for distinguishing said pattern in said field from said selected possible patterns in accordance with the magnitude of said number of times with respect to at least one of said patterns.

* * * * *